United States Patent [19]

Ross

[11] 4,093,544
[45] June 6, 1978

[54] METHOD AND APPARATUS FOR AMMONIA-NITROGEN REMOVAL BY VACUUM DESORPTION

[75] Inventor: David S. Ross, Lorain, Ohio

[73] Assignee: Sterling Drug, Inc., New York, N.Y.

[21] Appl. No.: 741,466

[22] Filed: Nov. 12, 1976

Related U.S. Application Data

[63] Continuation of Ser. No. 247,262, Feb. 5, 1975, abandoned.

[51] Int. Cl.² .......................... C01C 3/00; C02C 1/02
[52] U.S. Cl. .................................. 210/59; 55/70; 55/160; 55/195; 210/71; 210/120; 210/180; 210/181; 210/257 R; 423/238
[58] Field of Search ............... 55/53, 55, 70, 160, 55/189, 195; 202/205; 203/11, 91; 210/18, 57, 58, 59, 71, 120, 180, 181, 187, 127, 257 R, 258; 417/102, 103, 148, 149; 423/238, 352, 356

[56] References Cited

U.S. PATENT DOCUMENTS

| B 485,401 | 1/1976 | Blaine | 423/238 |
|---|---|---|---|
| 2,115,453 | 4/1938 | Baker | 55/189 |
| 2,339,369 | 1/1944 | Baker | 55/189 |
| 2,357,445 | 9/1944 | Baker | 55/189 |
| 2,533,992 | 12/1950 | Brunjes | 203/91 |
| 2,549,620 | 4/1951 | Mitchell | 417/120 |
| 2,704,034 | 3/1955 | Jones | 417/120 |
| 2,735,623 | 2/1956 | Baker | 55/189 |
| 2,935,451 | 5/1960 | Troyan | 203/91 X |
| 3,054,726 | 9/1962 | Fields et al. | 55/70 |
| 3,205,588 | 9/1965 | Oetjen et al. | 210/71 X |
| 3,300,392 | 1/1967 | Ross et al. | 202/176 |
| 3,371,865 | 3/1968 | Ross et al. | 55/189 |
| 3,386,804 | 6/1968 | Neugebauer et al. | 423/352 |
| 3,468,795 | 9/1969 | Bye-Jorgensen et al. | 210/220 X |
| 3,518,166 | 6/1970 | Klett | 55/55 X |
| 3,824,185 | 7/1974 | Caldwell et al. | 210/18 X |

OTHER PUBLICATIONS

R. & G. Clup, *Advanced Wastewater Treatment*, (1971), Van Nostrand Reinhold Co., New York, pp. 51–68.

Primary Examiner—Charles N. Hart
Assistant Examiner—Robert H. Spitzer
Attorney, Agent, or Firm—Meyer, Tilberry & Body

[57] ABSTRACT

A method and apparatus for removing ammonia nitrogen from wastewater at any given temperature. The apparatus and method includes the concept of increasing the pH of the wastewater to a highly basic condition, exposinng the wastewater to a vacuum having an absolute pressure at least approaching the vapor pressure of the wastewater proportional to the given temperature whereby ammonia gas is then desorbed from the wastewater, and subsequently absorbing the desorbed ammonia in a body of liquid having a pH substantially less than the highly basic condition of the original wastewater.

29 Claims, 15 Drawing Figures

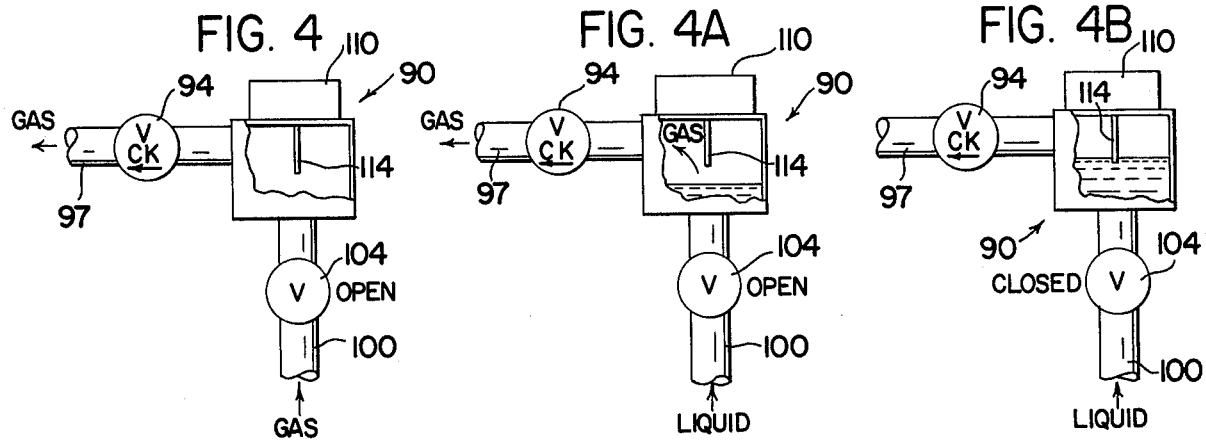
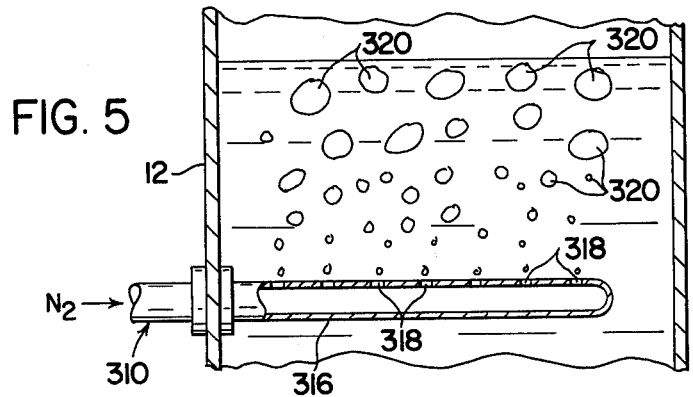
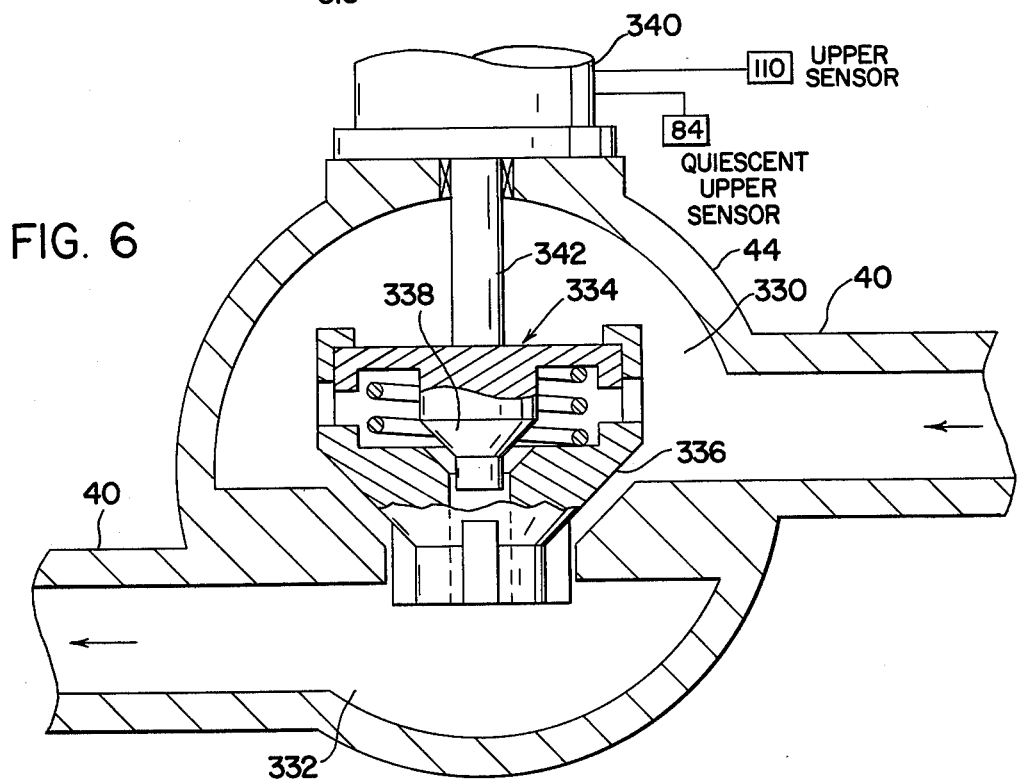

TANK A FILLED

TANK A EVACUATED  TANK B FILLED

TANK B EVACUATED  TANK A FILLED

METHOD AND APPARATUS FOR AMMONIA-NITROGEN REMOVAL BY VACUUM DESORPTION

This is a continuation of application Ser. No. 547,262 filed Feb. 5, 1975, now abandoned.

The present invention relates to the art of treating wastewater and more particularly to a method and apparatus for removing ammonia-nitrogen from a wastewater by vacuum desorption of the wastewater.

BACKGROUND OF INVENTION

In recent years, substantial advances have been made in the technology for treating wastewater, both domestic and industrial, so that it may be introduced into receiving bodies of water with a minimum of pollution. The requirements for treating wastewater have steadily increased. One of the requirements which is becoming more important is the elimination of nitrogen from wastewater effluent after the effluent has been processed for removing other polluting constituents. The desirability of eliminating nitrogen was set forth in a recent United States Environmental Protection Agency publication entitled "Nitrification and Denitrification Facilities, Wastewater Treatment". In this article which was published in 1973, the Technology Transfer Seminar publication stated in part "with regard to eutrophication of surface water, nitrogen in the fixed form of an ammonium and nitrate ions is considered to be one of the major nutrient supporting blooms of green and non-nitrogen fixing blue-green algae. Nitrogen removal from wastewaters is being requested in some areas and considered in many others. Where discharge is to lakes or reservoirs with significant detention times, seasonal removal will not suffice and performance 365 days per year will be expected." This same article recommends biological systems of nitrification followed by biological denitrification to remove nitrogen from wastewater. The biological systems are complicated by various factors, such as the presence of fragile bacteria, temperature change, cell residence time, carbonaceous B.O.D., pH, carbon source availability and potential repollution by the system. As a follow-up to this 1973 article, a 1974 publication by the United States Environmental Protection Agency entitled "Physical-Chemical Nitrogen Removal-Wastewater Treatment" concludes that all processes now under study for removing nitrogen from waste-water have certain disadvantages, and no single process is considered superior and adapted for general use in removing nitrogen from wastewater. Some of the systems outlined in this 1974 article include physical-chemical systems, such as ion exchange and breakpoint chlorination, which systems are of questionable value due to their excessive cost, control difficulties and possible recontamination by the resulting substances. Another system described in the 1974 article is the ammonia stripping process. Ammonia stripping of ammonia nitrogen from wastewater, has at least some theoretical advantages since this system can treat conventional wastewater treatment equipment effluent. In an ammonia stripping process, wastewater containing dissolved ammonia is passed through a scrubbing tower having air circulating therethrough. The circulated air removes a certain portion of the ammonia which separates from the wastewater effluent. In such a system, the pH of the wastewater effluent is increased to concentrate the amount of nitrogen in the form of ammonia gas within the wastewater as compared to the amount of nitrogen in the form of dissolved ammonium ions. Ammonia stripping does not remove all of the ammonia gas since this gas is highly soluble in the wastewater. The ammonia stripping process has the disadvantage of poor efficiency in cold weather and the potential for scaling problems that may reduce its efficiency and also raises concern over ammonia gas discharge to the atmosphere.

The present invention is adapted to operate in many difficult types of processes containing objectionable quantities of ammonia-nitrogen. Ammonia-nitrogen is present in wastewater as both ammonium ions and ammonia gas. The ratio of the quantity of ammonia gas to ammonium ions is a function of both the pH and temperature of the wastewater or wastewater effluent. As an example, the ratio of ammonia to ammonium ions for a wastewater at approximately 25° C may be expressed by the following equation:

$$\log \left[ \frac{NH_3}{NH_4^+} \right] = pH - 9.25$$

At higher temperatures, the percentage of ammonia gas increases for any given pH. In a like manner, at lower temperatures, the percentage of ammonia gas decreases for a given pH.

In some ammonia stripping processes, the incoming wastewater effluent, which may have been previously processed to remove other pollutants, is mixed with a substance, such as lime, to create a highly basic liquid. The use of lime has the ancillary advantage of removing phosphates by precipitation. The pH of the liquid is increased to over a pH of 10. As was previously mentioned, the higher the pH, the higher the ratio of ammonia gas to ammonium ions in the wastewater or wastewater effluent. By providing higher concentrations of ammonia gas, the present invention, which will be defined later, can remove a higher percentage of the ammonia gas in order to substantially reduce the total ammonia-nitrogen content of the wastewater.

As further background to the present invention, it is known that ammonia gas may be driven from a liquid contaminated with ammonia if the liquid is boiled by heating the liquid to the boiling temperature. This concept is used in the Keljdahl test for ammonia in a liquid. Such boiling may also be induced by lowering the absolute pressure over the body of liquid containing dissolved ammonia gas to the vapor pressure proportional to the temperature of the contaminated liquid.

Disadvantages of prior systems for removing ammonia gas from wastewater or wastewater effluent are overcome by the present invention which relates to a method and apparatus for vacuum desorption of ammonia gas from wastewater effluent. Throughout this specification wastewater is used to mean any wastewater liquid irrespective of prior treatment.

THE PRESENT INVENTION

In accordance with the present invention, there is provided an apparatus for removing ammonia gas from wastewater contaminated with an ammonia-nitrogen and having a given pH and a given temperature. This apparatus comprises means for increasing the pH of the wastewater to a highly basic condition, tank means for receiving the highly basic wastewater, means for creating a vacuum having an absolute pressure at least approximating the vapor pressure of the wastewater at the given temperature, means for applying the vacuum to the tank means whereby ammonia gas is desorbed from the wastewater, means for holding a body of liquid having a pH less than the highly basic condition, and means for exposing the desorbed ammonia to the liquid body whereby the desorbed ammonia gas is reabsorbed into the liquid body.

In accordance with another aspect of the present invention, there is provided a method of removing ammonia gas from wastewater contaminated with ammonia based substance and having a given pH and a given temperature. This method comprises the steps of increasing the pH of the wastewater to a highly basic condition, applying to the wastewater a vacuum having a pressure at least approximating the vapor pressure of the wastewater at the given temperature whereby ammonia gas is desorbed from the wastewater and then absorbing the desorbed ammonia gas in a body of liquid having a pH substantially less than the highly basic condition.

In accordance with another aspect of the present invention, means are provided for introducing bubbles of a gas which is only slightly soluble in the wastewater into the desorption tank. In this manner, molecular agitation takes place in that the release of fine gas bubbles in the wastewater reduces surface tension. Since a vacuum corresponding to the vapor pressure of the wastewater is created over the wastewater in the desorption tank, incoming gas introduced at approximately atmospheric pressure will expand drastically in the tank and create a substantial volume of bubbles for reducing the surface tension and, thus, increasing the rate of removal of ammonia gas from the wastewater with very small quantities of gas. This molecular agitation caused by the introduction of a low solubility gas, such as nitrogen or air, substantially enhances the overall removal of ammonia gas, the percentage of which has been increased by the changed pH of the wastewater. These bubbles create agitation with minimum liquid vapor carried from the body of wastewater being subjected to a high vacuum in the desorption tank.

In accordance with another aspect of the present invention, the liquid into which the desorbed ammonia gas is subsequently absorbed has a reduced pH. In one embodiment, the absorbing liquid is acidic. In addition, this absorbing liquid may have a reduced temperature created by refrigeration or other cooling means to further increase its ability to absorb ammonia gas.

In accordance with another aspect of the invention, the wastewater in the desorption tank is heated to decrease the surface tension of the wastewater and decrease the ability of the wastewater to retain dissolved ammonia gas. This further enhances the removal of the ammonia gas from the wastewater in the desorption tank.

The present invention lowers the absolute pressure within the desorption tank or vessel which contains wastewater at a preselected pH so that the pressure over the wastewater corresponds to the vapor pressure of the admixture for the temperature of the wastewater. This causes a high release of ammonia gas even though the gas is highly soluble in the wastewater. Because of this high solubility of ammonia gas in the wastewater, an absolute pressure higher than the vapor pressure corresponding to the temperature of the wastewater will not result in removal of ammonia gas by vacuum alone. The present invention can exceed 90% removal which is highly satisfactory. Vapors and desorbed gases are evacuated and carried from the desorption tank or vessel into another vessel wherein the gases and vapors are re-dissolved and/or condensed for subsequent disposal or reuse.

In accordance with the preferred embodiment of the present invention, the low pressures used in the desorption tank are generated by a spaced vacuum generator including a first vessel which is filled completely with a liquid and sealed from atmosphere ingress of gas. The liquid is then removed from the filled vessel. In this manner, the absolute pressure in the cavity of the first vessel created by the removal of liquid therefrom will approach the vapor pressure of the liquid in this first vessel. The vapor pressure of the liquid in the evacuated vessel or tank is a function of the temperature of the liquid. For example, vapor pressure of water at 100° C is equal to atmospheric pressure at sea level, i.e., 760 mm. The vapor pressure of water at 20° C is 17.535 mm and at 0° C the vapor pressure of water is only 4.5 mm. Thus, the vacuum created in the evacuated tank is essentially the vapor pressure according to the temperature of the liquid in the evacuated tank. The above values assume that the liquid in the evacuated tank is water which can be used for this purpose. This low pressure created above the liquid in the evacuated tank and corresponding to the vapor pressure of this liquid, in accordance with the preferred embodiment of the invention, is then applied to the desorption tank or vessel. In the preferred embodiment, the temperature of the displaced liquid in the displacement tanks or vessels is reduced to a temperature less than the wastewater temperature. Thus, the pressure of the vacuum within the desorption tank will be reduced to a pressure approaching the vapor pressure of the cooler liquid in the displaced or evacuated tank which is lower than the vapor pressure of the wastewater. The application of this lower pressure to the desorption tank is continued by the additional displacement of the cooler liquid in the displacement vessel until the displacement vessel is evacuated to a predetermined extent. In this manner, a relatively low pressure is applied to the desorption vessel or tank which causes the desorption tank to go to the vapor pressure of the wastewater having a temperature above the displacement liquid temperature. Thus, a high percentage of dissolved ammonia gas is extracted from the wastewater being treated. The heat removed from the displacement liquid to reduce its temperature may be applied to the wastewater.

In accordance with another aspect of the preferred embodiment of the invention, the low pressure or vacuum applied to the desorption vessel or tank is continued by evacuation of a second displacement tank that is filled by the liquid being evacuated or pumped from the first mentioned displacement tank when it is being evacuated. By using two displacement tanks, a substantially continuous vacuum for use in the desorption tank is created by alternately evacuating the two tanks with liquid being pumped from one into the other and vice versa. After one of the displacement tanks has been evacuated, the cavity over the liquid in this tank contains ammonia gas and other gases which are partially soluble in water, such as air and nitrogen, and vapors, such as water vapor. These gases and vapors have been extracted in part from the liquid in the desorption tank or vessel containing the contaminated liquid and pulled by the vacuum to the displacement tank. These gases and vapors in the cavity above the liquid level in the displacement vessel will either be absorbed into the liquid of the displacement vessel or expelled into atmosphere when the vessel is subsequently filled by liquid from the other displacement tank. Since ammonia is highly soluble in low pH water and similar liquids, the ammonia gas will be reabsorbed in the water of the displacement tank unless an intercepting mechanism such as an accumulator is used to reabsorb the ammonia gas before it reaches the liquid in the displacement tank. The rate of displacement of liquid in the two displacement tanks is proportional to a pumping rate determined by pumps used to alternately fill and evacuate the two displacement tanks which act as a vacuum generator for creating the vacuum used in the desorption tank or vessel.

The greater the temperature differential between the liquid in the displacement tanks and the contaminated liquid effluent in the desorption vessel, the greater the vapor pressure differential between these two tanks. The vapor pressure differential controls the desorption action and the effectiveness of the desorption process is also a function of the rate of displacement in the two vacuum generating displacement tanks.

In accordance with another aspect of the present invention the absolute pressure applied in the desorption tank is further decreased by an auxiliary pumping mechanism, such as a positive displacement pump or blower.

The primary object of the present invention is the provision of a method and apparatus for desorbing ammonia gas from a wastewater, which method and apparatus is effective over a wide temperature range and involves a reasonable capital expense.

Another object of the present invention is the provision of a method and apparatus, as defined above, which method and apparatus uses a vacuum corresponding to the vapor pressure over the wastewater effluent after the effluent has been made highly basic.

Another object of the present invention is the provision of a method and apparatus, as defined above, which method and apparatus reduces the ability of the wastewater to retain ammonia gas and, thus, enhances removal of such gas from the wastewater effluent.

Still a further object of the present invention is the provision of a method and apparatus as defined above, which method and apparatus uses a differential of vapor pressures created as a function of a differential in liquid temperatures to remove ammonia gas from a wastewater.

Yet another object of the present invention is the provision of a method and apparatus as defined above, which method and apparatus uses a molecular agitation concept to reduce surface tension and increase the removal of ammonia gas from a wastewater.

Yet another object of the present invention is the provision of a method and apparatus as defined above, which method and apparatus uses a mechanically created differential between the vacuum creating device and the desorption tank.

BRIEF DESCRIPTION OF DRAWINGS

The above-mentioned objects and other objects and advantages will become apparent from the following description taken together with the accompanying drawings in which:

FIG. 4, 4A and 4B are enlarged views showing the venting concept employed in the preferred embodiment as shown in FIG. 1;

FIG. 5 is a partial cross-sectional view illustrating, somewhat schematically, the molecular agitation concept employed in the preferred embodiment of the present invention;

FIG. 6 is a schematic, cross-sectional view illustrating a two position quiescent valve which could be used at the inlet of the displacement tanks employed in embodiments of the present invention, as shown in FIGS. 1, 7 and 8;

DESCRIPTION OF PREFERRED EMBODIMENT

Figure 1:
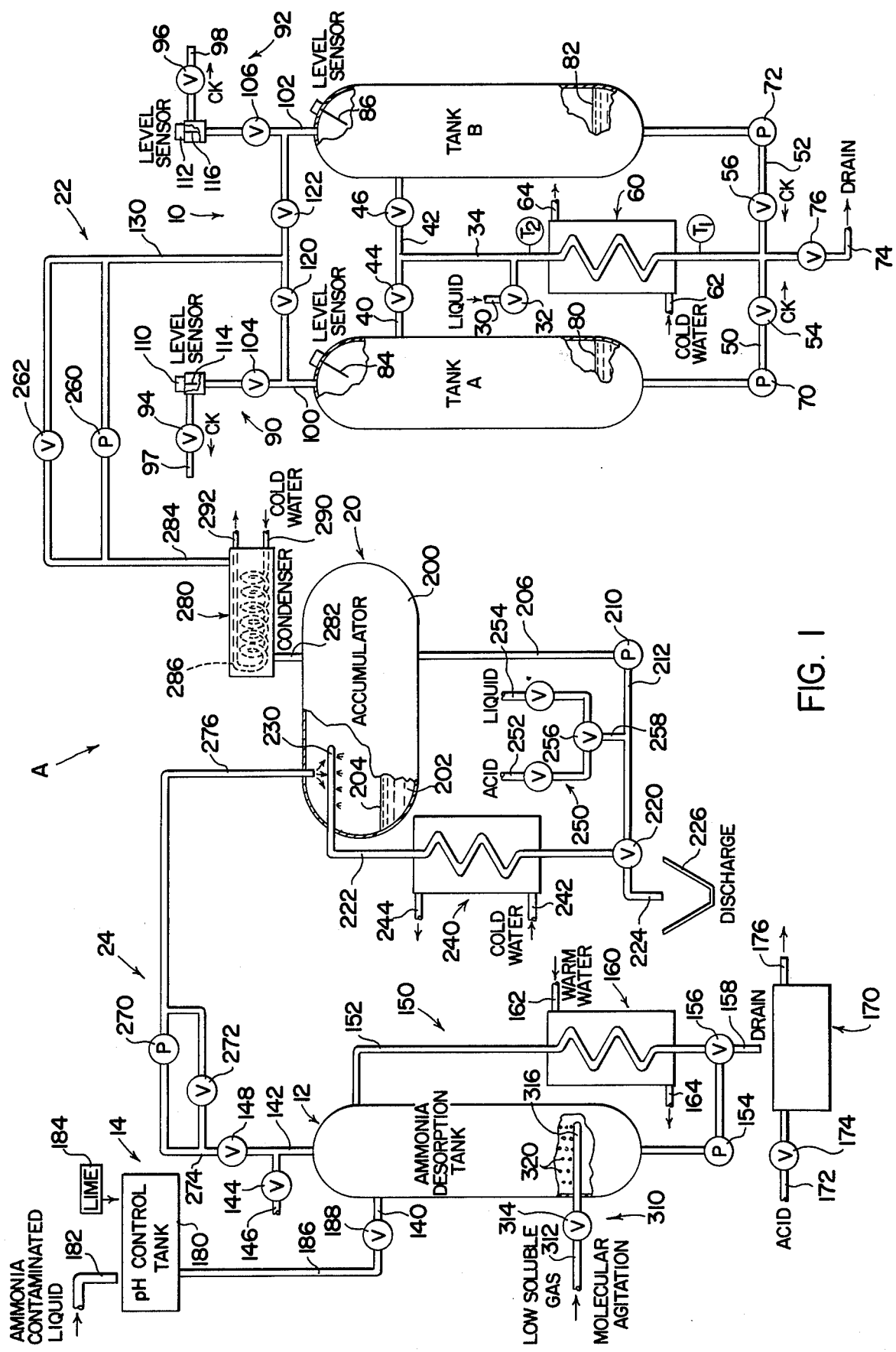
FIG. 1 is a schematic flow diagram illustrating the preferred embodiment of the present invention.

Referring now to the drawings, wherein the showings are for the purpose of illustrating a preferred embodiment of the invention and not for the purpose of limiting same, FIG. 1 shows an apparatus A for removing ammonia gas from a wastewater, which apparatus includes a vacuum generator 10, an ammonia desorption tank or vessel 12, an inlet system 14, an accumulator 20, a first vacuum connection system 22 and a second vacuum connection system 24. Each of these components will be described in detail, and then the operation of the preferred embodiment illustrated in FIG. 1 will be apparent.

Referring now to vacuum generator 10, this generator is used to develop a vacuum for application in tank 12 of a vacuum which corresponds to the vapor pressure for the wastewater within tank 12. When the vapor pressure of the effluent in tank 12 is reached, the effluent boils to cause removal of ammonia even though ammonia is highly soluble in the wastewater and cannot be easily removed in appreciable quantity at higher pressures. Various vacuum generators could be used; however, in accordance with the preferred embodiment of the present invention, the vacuum generator 10 includes an inlet line 30 for water or another appropriate pumping liquid. The inlet is controlled by a selectively operated valve 32 for communicating the inlet with a vertically extending pipe 34. Upper branches 40, 42 of pipe 34 communicate with tanks A, B, respectively, through selectively actuated valves 44, 46, respectively. These valves may be two position valves to create quiescent conditions at the top of the filling cycles, as schematically represented in FIG. 6. Lower branches 50, 52 of vertical pipe 34 include check valves 54, 56, respectively, which check valves allow flow, as indicated by the arrows of FIG. 1.

For a purpose to be explained later, the preferred embodiment of the invention includes a heat exchanger 60 to cool the liquid flowing through vertically extending pipe 34. In accordance with the illustrated embodiment, heat exchanger 60 includes an inlet 62 for cold liquid, such as water, and a liquid outlet 64. Liquid entering inlet 62 may be cooled by an appropriate refrigerating device, not shown. Tanks A, B include lower pumps 70, 72, respectively, for pumping liquid between the two tanks, in a manner to be described later. A drain 74 is controlled by a selectively operated valve 76 for draining liquid from the vacuum generator 10 when necessary. In the preferred embodiment shown in FIG. 1, contamination of the liquid within tanks A and B by ammonia gas from desorption tank 12 is somewhat eliminated by the use of accumulator 20. The operation of the accumulator to remove ammonia gas from tank 12 will be described later. When an absorbing component is used between vacuum generator 10 and tank 12, a substantial amount of time may elapse between successive rechargings of the liquid within tanks A, B. In that situation, only vapor condensed in the liquid of tanks A, B will cause the liquid volume to increase.

In the preferred embodiment, tanks A, B are provided with appropriate devices for sensing upper levels of liquid within the tanks. This can be done by a variety of liquid level sensing devices, which are schematically illustrated as high level sensors 84, 86. The high level sensors, in the preferred embodiment, do not discontinue the filling cycle of the tanks. They are used in conjunction with quiescent valves 44, 46, and shut off valves 104, 106 in a manner to be described later.

At the upper portion of tanks A, B there are provided two gas discharge and liquid trapping mechanisms 90, 92 which include check valves 94, 96, gas outlets 97, 98 positioned at the top of stand pipes 100, 102 communicated with the upper portion of tanks A, B, selectively operated valves 104, 106 and liquid level sensing devices 110, 112. The level sensing devices include downwardly extending probes 114, 116, respectively. These probes determine the maximum upper level of liquid within tanks A, B during normal operation of vacuum generator 10. To complete the description of the vacuum generator components, selectively operated valves 120, 122 communicate the stand pipes 100, 102, respectively, with a vacuum line 130, which is communicated with tank 12 through vacuum connection systems 22, 24 and accumulator 20.

Figure 7:
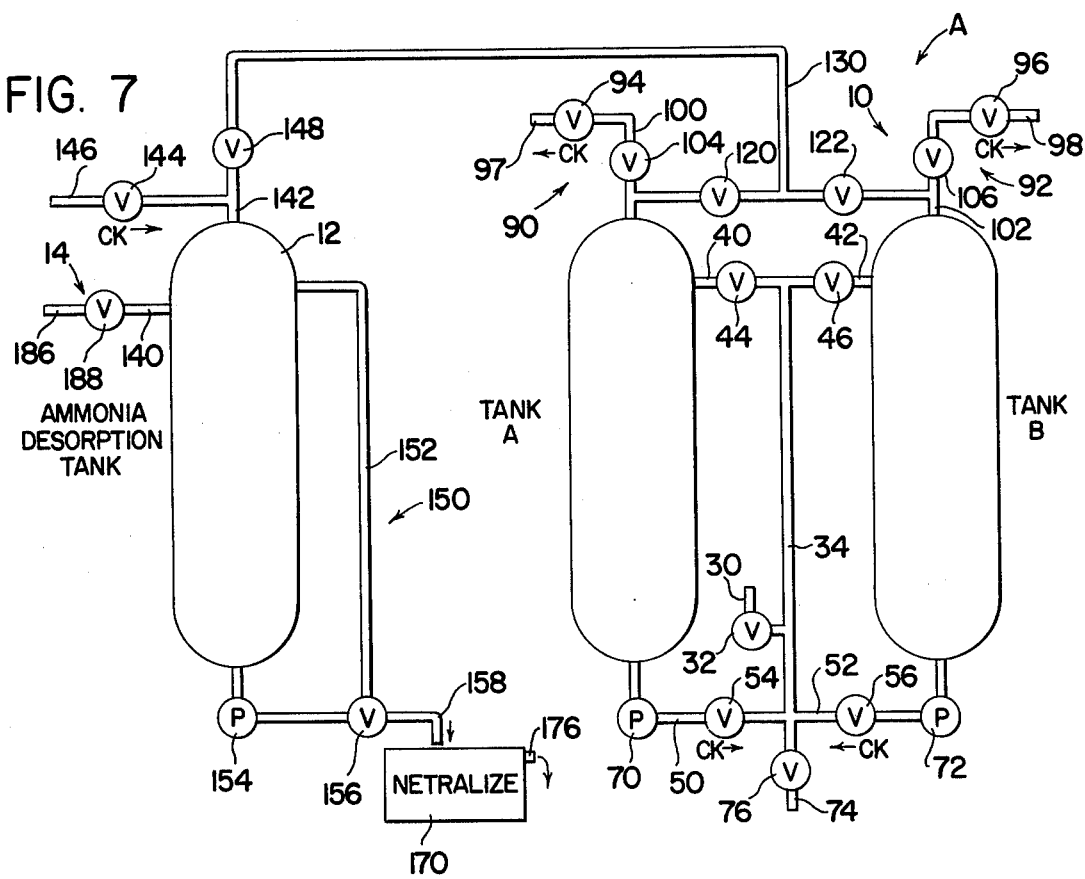
FIG. 7 is a schematic flow diagram illustrating a simplification of the preferred embodiment of the present invention.
Figure 7A:
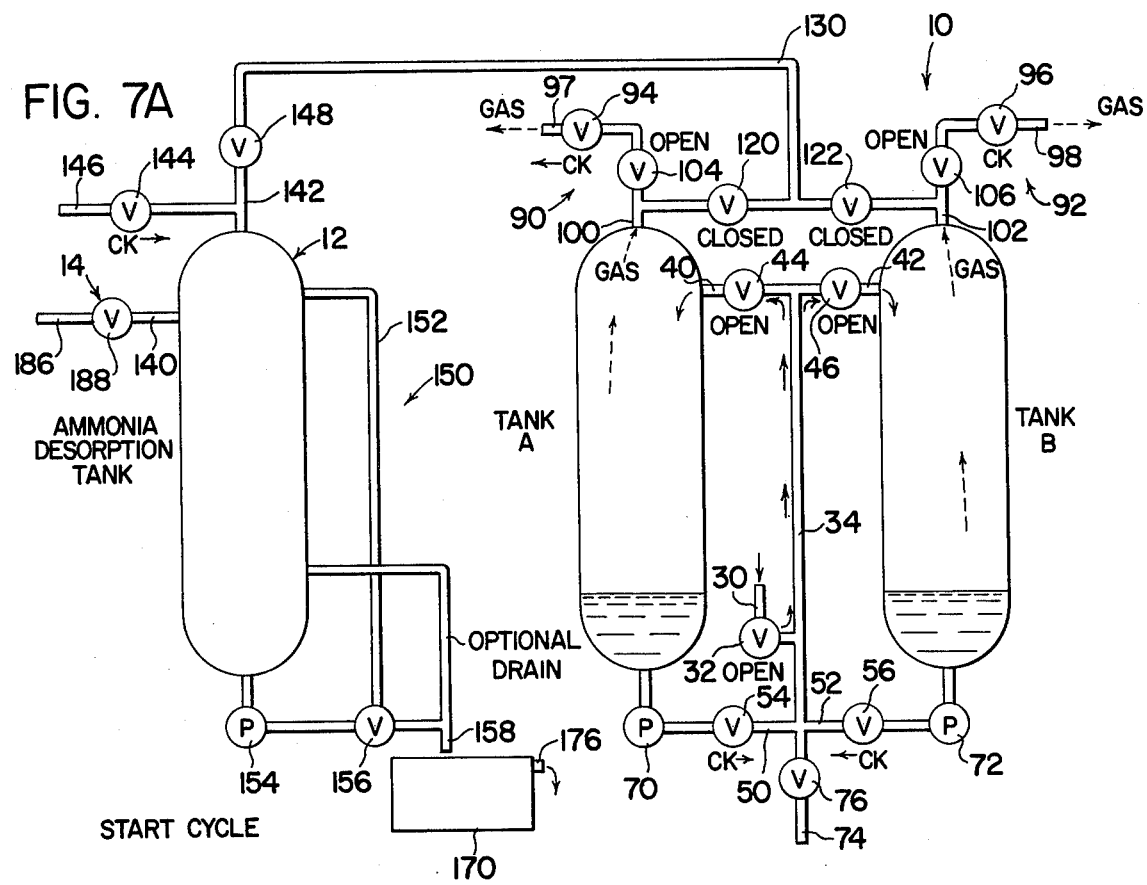
FIGS. 7A, 7B, 7C, and 7D are views similar to FIG. 7 showing various operating characteristics of the simplified structure illustrated in FIG. 7, which description applies to the embodiments shown in FIGS. 1 and 8.
Figure 7B:
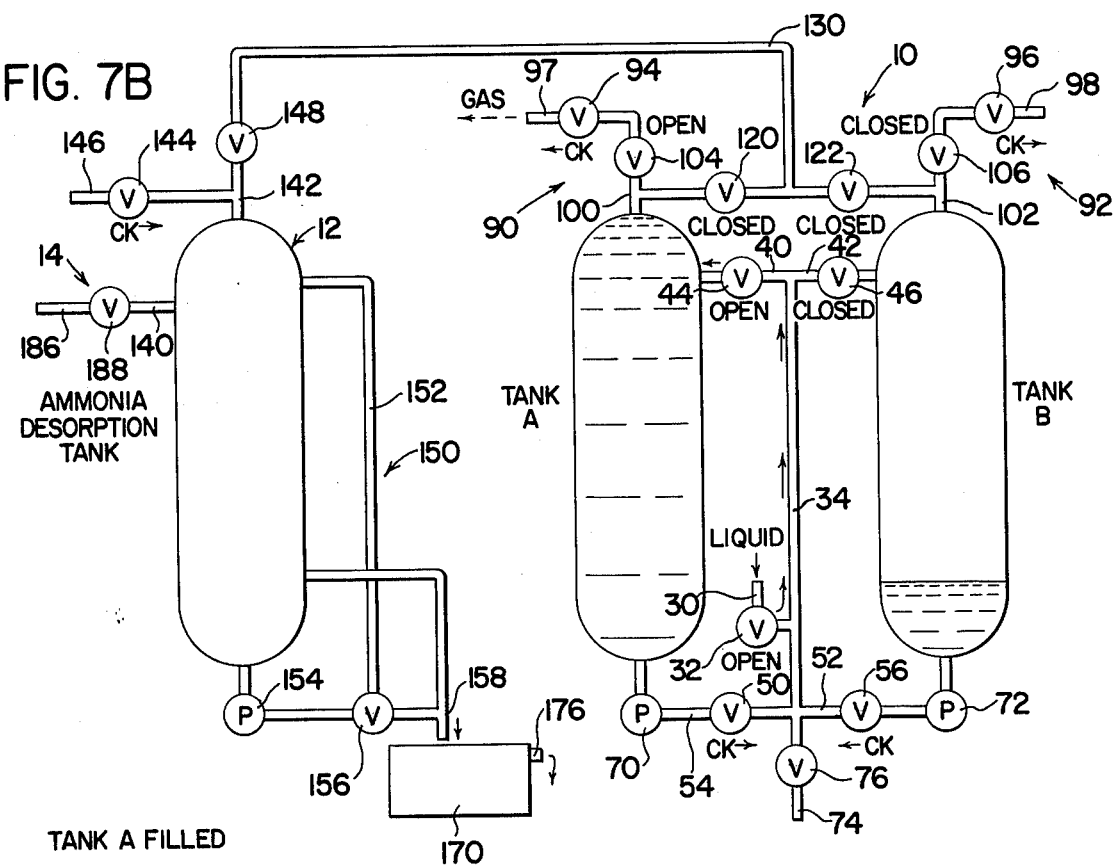
Figure 7C:
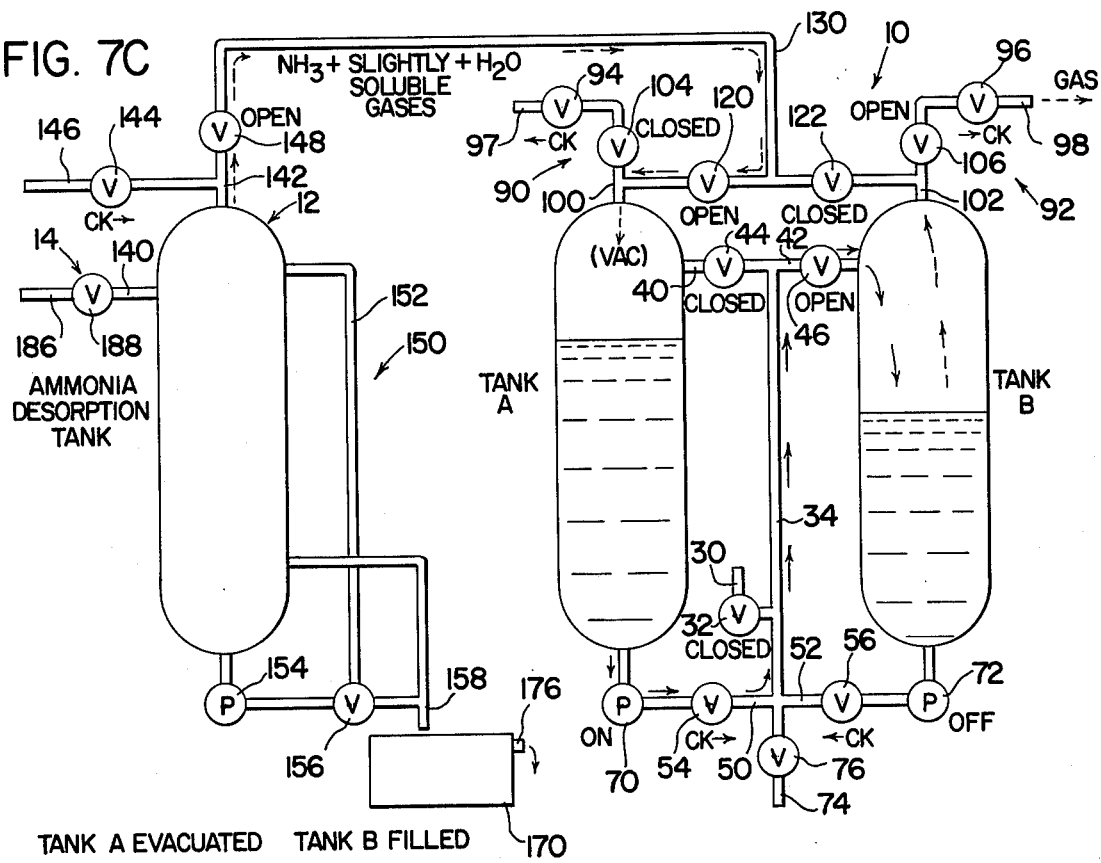

Referring now to FIGS. 7, 7A–D, the operation of vacuum generator 10 is illustrated. In FIG. 7, the apparatus A' is somewhat simplified. Vacuum line 130 is communicated directly to ammonia desorption tank 12 without going through the two connecting systems 22, 24 and accumulator 20. This is a simplified version of the preferred embodiment of the invention and can be used to explain the operation of the vacuum generator. As shown in FIG. 7A, valve 32 is opened to introduce liquid, such as water, into vertical line 34. At this time, valves 44, 46 are fully opened and valves 104, 106 are opened. Thus, tanks A, B, are filled to minimum levels 80, 82 as schematically shown in FIG. 1. Any gas entrapped within tanks A, B, is forced outwardly through check valves 94, 96. After reaching the minimum level as schematically shown in FIG. 7A, valve 46 is fully closed allowing all liquid from inlet line 30 to pass through pipe 34 into tank A. Check valves 54, 56 prevent flow of liquid downward through pipe 34. As flow of liquid is continued into tank A, through upper branch 40 and valve 44, the liquid level rises as indicated in FIG. 7B. This compresses and forces gas in the cavity above the rising liquid through open valve 104 out gas outlet 97 through check valve 94. This filling action is continued until tank A is fully filled which is determined by upper level sensor 110, shown in FIG. 1. At that time, valves 32, 44, and 104 are closed. This entraps liquid above valve 104 for a purpose to be explained in connection with FIG. 4. As shown in FIG. 7C, pump 70 is then energized to evacuate liquid from tank A and pump this liquid through check valve 54, through lower branch 50 and into vertically extending pipe 34. After a selected time which purges any gas within the vertical line 34, valve 46 of branch 42 is fully opened. This allows the liquid from tank A to enter tank B. During this operation, valve 106 is opened so that as liquid enters tank B and fills this tank, undissolved gas and any uncondensed vapor is forced through valve 106 and check valve 96 and out gas outlet 98. This gas removal is continued until tank B is filled to a level determined by probe 116 of level sensor 112, as shown in FIG. 1. During this time, a vacuum is created above the decreasing liquid level in tank A, which vacuum is communicated by open valve 120 to the vacuum line 130 communicated with ammonia desorption tank 12.

The vacuum within tank A is determined by the vapor pressure of the liquid within the tank, and this vapor pressure decreases with temperature. For that reason, heat exchanger 60 shown in FIG. 1 is used to reduce the temperature of the liquid within tanks A and B. This increases the vacuum by decreasing the vapor pressure obtainable above the liquid level in the tank being evacuated.

Figure 7D:
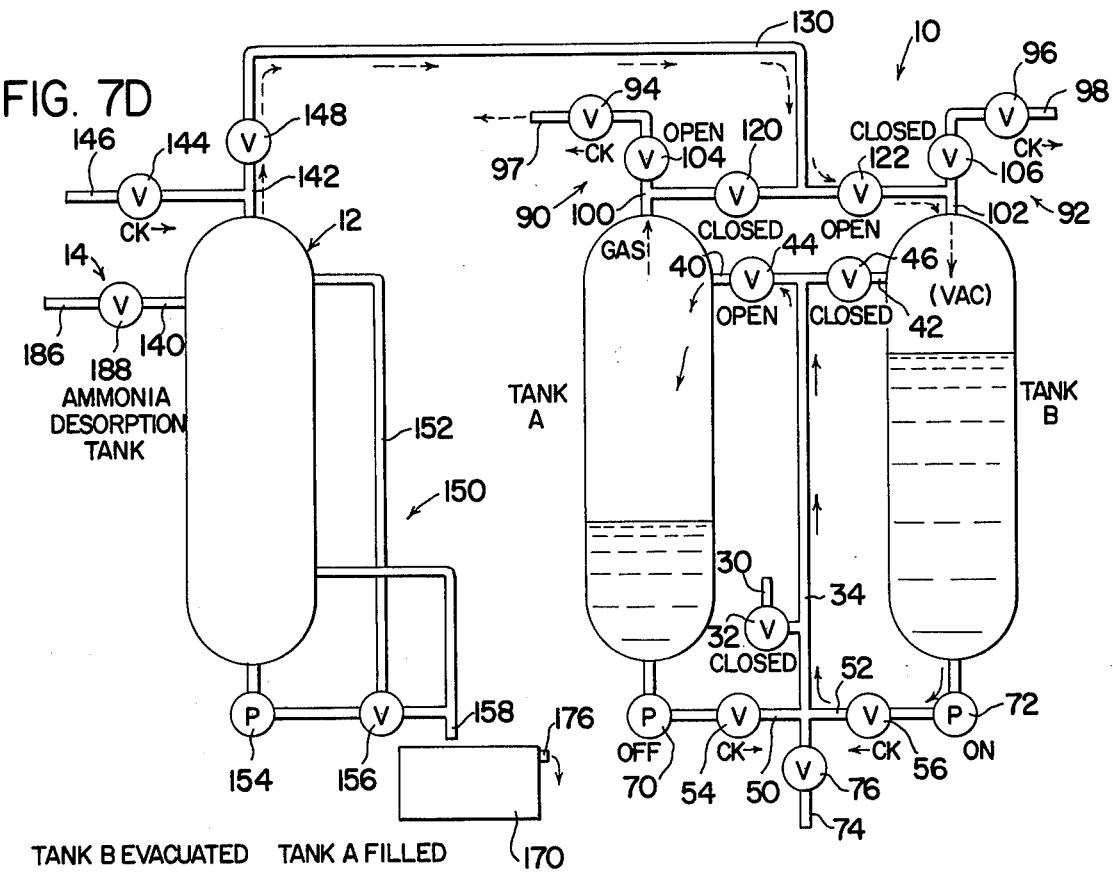

After tank A has been evacuated and tank B has been filled, the reverse action takes place wherein tank B is evacuated and tank A is filled. This is shown in FIG. 7D. In this situation, valve 44 is fully opened after pump 72 is energized to pump liquid from tank B to tank A. Valve 104 is opened and valve 122 is opened. This communicates vacuum line 130 with the low pressure vacuum created above the decreasing level of liquid in tank B. To provide a positive liquid seal above tank B, selectively operated valve 106 is closed during evacuation of tank B.

Referring now to FIGS. 4, 4A and 4B, the liquid trapping mechanism above tanks A and B is schematically illustrated. During a filling operation, compressed gas first enters stand pipe 100 through open valve 104, as shown in FIG. 4. This gas exits through check valve 94 and outlet 97 when its pressure exceeds atmospheric pressure. As the tank continues to fill, liquid rises through stand pipe 100 and past open valve 104, as shown in FIG. 4A. Compressed gas above the liquid is still forced through outlets 97 and check valve 94. As the liquid reaches probe 114, liquid sensor 110 is energized to close the valve 104 and start the reverse filling action. This structure traps liquid above valve 104. In addition, level sensor 110 also indicates that the tank is filled and the opposite pumping action is to take place, as previously described. Any appropriate control mechanism can be used for operating the various valves and level sensors as described herein and the structure of these control mechanisms does not form a part of the present invention. By entrapping liquid above closed valve 104, a liquid gas seal is created to prevent inadvertent ingress of atmospheric air while the tank under stand pipe 100 is being evacuated. As soon as the pump is energized to again fill the tank under stand pipe 100, valve 104 is opened. When this happens, the liquid above valve 104 is allowed to flow by gravity into the tank for the next filling cycle.

As can be seen, vacuum is applied by vacuum generator 10 through line 130. This vacuum has a pressure determined by the vapor pressure above the liquid in the evacuated tank, which is temperature dependent. By reducing the temperature of the liquid in tanks A, B lower vapor pressure is possible and a higher vacuum is thereby created. This lower pressure or higher vacuum is sufficient to establish a low pressure over the wastewater in tank 12 corresponding to the vapor pressure of the wastewater. This causes a sufficiently low pressure above this liquid to remove the dissolved ammonia in the wastewater. The liquid in tank 12 is subjected to a sufficiently low pressure equal to the vapor pressure of the wastewater at its particular temperature. This causes boiling of the wastewater and desorption of the ammonia gas from the wastewater.

Referring now to the vacuum ammonia desorption tank 12, as shown in FIG. 1, this tank includes an inlet 140 for wastewater which has been previously treated by inlet system 14 with a substance to increase the pH of the incoming wastewater. In practice, the pH of the incoming wastewater is determined by the desired amount of ammonium ions to be converted to ammonia gas and the temperature of the wastewater taking into consideration the general ammonia gas relationship of FIG. 2. Since the materials used to increase the pH add cost to the total operation, the pH is not increased beyond an optional balance between cost and performance. At the upper portion of tank 12 there is provided a gas and vapor outlet 142 which is used to communicate the vacuum in line 130 of generator 10 to tank 12. A vent valve 144 communicates with gas outlet 146 to vent tank in order to drain tank 12 by gravity and vent the tank during filling. A valve 148 in line 142 is used to communicate tank 12 with the vacuum created by generator 10. Valve 144 is opened when tank 12 is being filled with ammonia contaminated wastewater. Gas above the liquid level within the tank is compressed and forced through valve 144 and out outlet 146 to atmosphere. By this arrangement, all the gas in tank 12 is not compressed and forced or drawn through connecting systems 22, 24 into vacuum generator 10. After tank 12 has been filled, valve 148 can be opened to communicate the vacuum of generator 10 to tank 12. In the preferred embodiment, this connection is not a direct connection as shown in FIG. 7. The vacuum connection is through connecting systems 22, 24 and accumulator 20. Tank 12 may be partially evacuated by communication with the vacuum by opening valve 148 and this can cause sucking of liquid into tank 12 from line 140 when control valve 188 is opened. In this filling operation, valve 188 is closed when tank 12 is properly filled.

A recirculating system 150 is attached to tank 12. This system includes line 152, pump 154, a diverter valve 156 and drain 158. A heat exchanger 160 is used to heat the wastewater circulated through line 152 and includes inlet 162 for a heated liquid and liquid outlet 164. The heat exchanger adds heat energy to the wastewater of tank 12 to replace the heat lost by evaporation and to elevate the actual temperature of the wastewater. Since heat is added to the wastewater in tank 12, in the preferred embodiment, heat exchanger 160 can have a recuperator effect on the cooling heat exchanger 60 used in the vacuum generator 10. Heat exchanger 160 is used to recapture and use the heat energy extracted by heat exchanger 60 and other cooling heat exchangers of apparatus A. Heating of the wastewater has various advantageous effects on the operation of apparatus A. As previously mentioned, the vapor pressure for a given liquid is temperature sensitive. Thus, the higher the temperature of the wastewater in tank 12 the higher the boiling point pressure. The differential in temperature between the liquid in generator 10 and the wastewater in tank 12 allows a pressure in generator 10 which is lower than the vapor pressure of heated wastewater in tank 12. Consequently, by heating the wastewater in tank 12 and cooling the liquid in generator 10, a more effective vacuum system is obtained and the vacuum applied to tank 12 tends to boil rapidly the wastewater.

Figure 2:
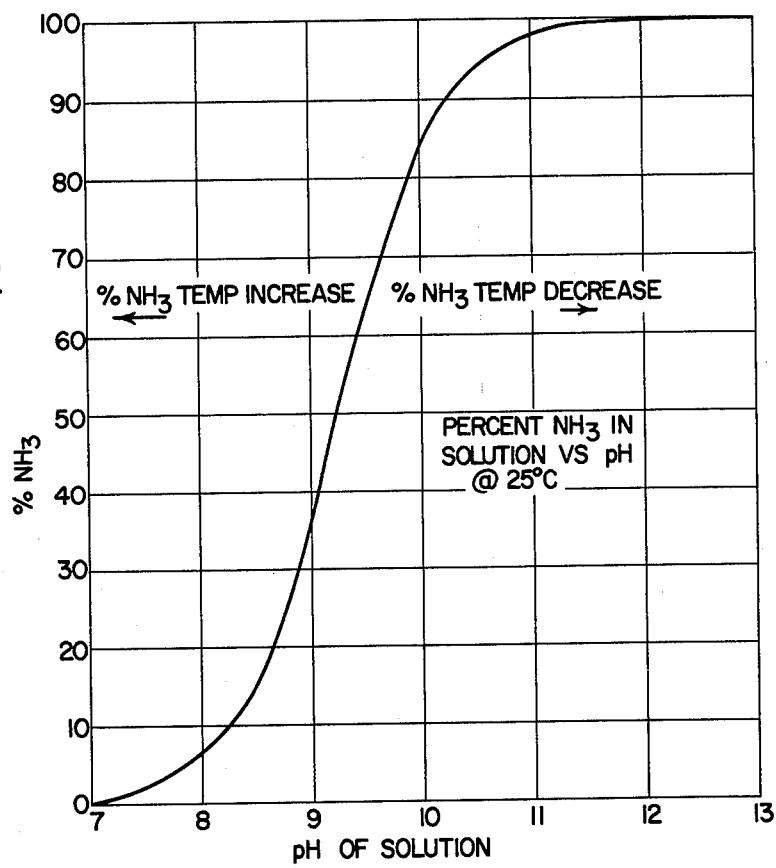
FIG. 2 is a graph showing the ammonia gas concentration in various pH solutions of wastewater.

By increasing the temperature of the wastewater in tank 12, a further advantage is obtained. This advantage is apparent from the relationship shown in FIG. 2. This graph illustrates the curve for the percentage of the ammonium ions converted to ammonia gas in the wastewater at different pH values and at a given temperature, which is 25° C in FIG. 2. It is noted that at 25° C and at a pH of 12.0, approximately 100% of the ammonium ions have been converted to ammonia gas within the wastewater and await desorption. If the temperature of the wastewater decreases, the graph of FIG. 2 shifts to the right. Thus, a lesser percentage of ammonium ions is converted to ammonia gas for a given pH value. The reverse is true. If the temperature of the wastewater is increased, the graph shifts to the left. Thus, for a given pH value of the wastewater, a higher percentage of the ammonium ions is converted to ammonia gas within the wastewater if the wastewater is heated. Thus, by heating the wastewater in tank 12, the curve of FIG. 2 is shifted to the left and a greater percentage of ammonia gas is present for a given pH. By shifting the curve, a lesser basic solution could be used in tank 12. Consequently, less materials are required to obtain the needed pH when the wastewater is heated. This reduces the overall cost of operating apparatus A. As is known, pH is a logarithmic function and any reduction of required pH has a substantial cost savings effect on the process. This is a further advantage of heating the wastewater in tank 12 by available waste heat. Heat exchanger 160 may be heated by using waste heat of other processes being performed adjacent the treatment facility using apparatus A.

Figure 3:
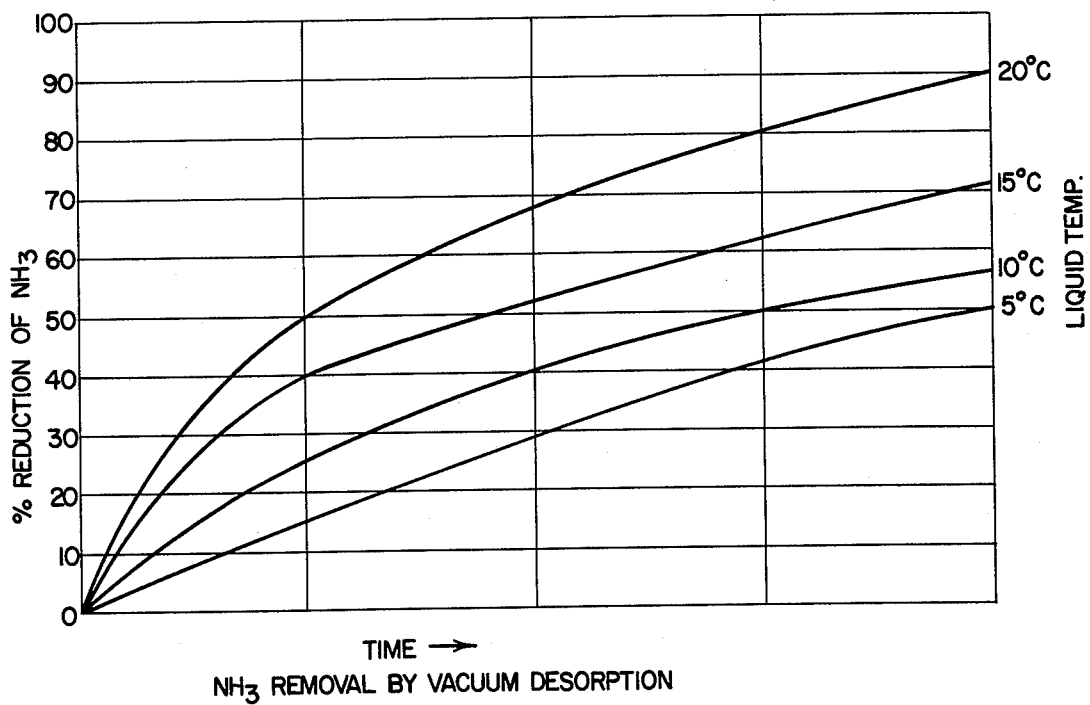
FIG. 3 is a graph illustrating that the present invention removes ammonia gas from solution at various temperatures of the wastewater and the effect which temperature has upon the rate of removal at a pH of 10.5.

A further advantage of increasing the temperature of the wastewater in tank 12 is illustrated by the graph of FIG. 3. This graph shows the removal of ammonia gas from the wastewater at various temperatures for a given vacuum, concentration and pH. The pH of this graph is 10.5. It is noted that as the temperature increases, a higher percentage of ammonia gas is removed in a given length of time. Thus, the residence time of the wastewater in tank 12 can be reduced by increasing the temperature of the wastewater to operate on a higher curve in FIG. 3. In addition, the rate of removal is increased to provide more efficient operation when the wastewater temperature is increased. This curve also relates to the effect of surface tension. Surface tension is decreased as the temperature of the wastewater increases. Thus, by heating the wastewater, a lower surface tension is obtained and an increased rate of release for ammonia gas is realized in tank 12.

The curve of FIG. 3 shows that by using the preferred embodiment of the present invention, high percentages of dissolved ammonia gas can be removed from the wastewater at temperatures even as low as 5° C. This is a substantial improvement over other systems for removal of ammonia gas which are temperature limiting and are basically ineffective at temperatures below about 10°–15° C. The present invention is temperature sensitive, but not temperature limiting.

In the illustrated embodiment of the invention, a receptacle or tank 170 is communicated with drain 158 of tank 12. By actuating diverter valve 156, liquid can flow through pump 154 and drain 158 into container or tank 170. Pump 154 can be energized to increase the speed of discharge for the processed wastewater of tank 12 after the desorption process has been continued for the desired length of time. In tank 170, an acid inlet 172 having a selectively operated valve 174 introduces acid into the tank to neutralize the basic wastewater coming from tank 12. The neutralized liquid is discharged from outlet 176 for subsequent processing or introduction into a stream or repository which requires a very low ammonium-nitrogen input load.

Referring now to the inlet system 14, a variety of arrangements could be provided for increasing the pH of the wastewater to be processed. In accordance with the illustrated embodiment, a holding and mixing tank 180 includes a first inlet 182 for an ammonium-ammonia contaminated wastewater. Lime or other substance to make the wastewater basic, is added from a receptacle 184. As is well know, lime is useful in precipitating phosphates from wastewater. This is an additional advantage of the system shown in FIG. 1. An outlet 186 for the holding and mixing tank 180 is directed to a selectively operated valve 188 for introducing a wastewater having the desired high pH into tank 12. Of course other arrangements could be used for obtaining a high pH for the wastewater and directing the contaminated wastewater into inlet 140 of tank 12.

Referring now to the accumulator 20, this accumulator is used to intercept and absorb a major portion of the ammonia gas from tank 12 which allows vacuum generator 10 to function primarily as a vacuum generator without performing the added function of absorbing the ammonia gas desorbed in tank 12. In the illustrated embodiment, accumulator 20 is in communcation with the two vacuum connecting systems 22, 24 and includes a tank 200 for holding a liquid or liquid body 202 having an upper level 204. An outlet 206 is connected to a pump 210 for forcing liquid 202 from tank 200 through a pump outlet 212, through diverter valve 220 and to an inlet line 222. A drain 224 allows discharge of the liquid from tank 200 into a container 226 when the absorbed ammonia content of liquid 202 is at a sufficiently high concentration. Inlet line 222 of tank 200 is communicated with an appropriately arranged spray head 230 for spraying circulated liquid 202 into the upper portion of tank 200. Heat exchanger 240 having inlet 242 and outlet 244 is used to cool liquid 202 for increasing its ability to absorb ammonia gas and for decreasing its vapor pressure, for reasons previously described. The pH in accumulator 20, in the preferred embodiment, is quite low so that liquid 202 is acidic or nearly acidic. At least, the pH should be substantially below the pH of the wastewater effluent in tank 12. To produce the acidic condition, an acidic control 250 is provided which includes an acid inlet 252 and a liquid inlet 254. The liquid is generally water. A metering valve 256 meters appropriate amounts of acid and liquid into line 212 through inlet line 258. At the charging cycle, diverter valve 220 is actuated to discharge liquid 202 from tank 200 through drain 224. Thereafter, diverter valve 220 is closed and an acid liquid mixture is forced into line 212. After a sufficient amount of liquid has been introduced into the accumulator, metering valve 256 is deactivated. Thereafter, accumulator 20 is used to absorb ammonia gas desorbed in tank 12. Since the ammonia gas will change the pH of liquid 202, periodically it may be necessary to introduce more acid or more acid and liquid through the acidic control 250. After the liquid has become heavily laden with absorbed ammonia gas, the accumulator is again recharged as previously discussed.

To connect vacuum line 130 from vacuum generator 10 to gas outlet 142 of tank 12, two vacuum connecting systems 22, 24 are provided. These systems not only provide communication of the vacuum from generator 10, but also increase the vacuum in accordance with the following discussion. Referring now to system 22, this system includes a positive displacement gas pump 260 having a bypass valve 262. As is known, the capacity of a positive displacement gas pump or blower is a function of the differential in pressure across the pump from inlet to discharge. The lower the discharge pressure and the lower the differential, the higher the volume capacity of the pump. Thus, when the vacuum of line 130 is first introduced to system 22, valve 262 is opened. This provides a high vacuum on both sides of positive displacement pump 260 so that a relatively low differential will exist from inlet to discharge. Thereafter, the positive displacement pump is actuated and valve 262 is closed so that vacuum is drawn through positive displacement pump 260 which acts upon the cavity above the liquid in tank 12 to further decrease the pressure and assure that the vapor pressure of the wastewater is obtained in desorption tank 12.

The second vacuum connecting system 24 includes a positive displacement pump 270, a bypass valve 272, an inlet 274 and an outlet 276. After a vacuum has been created by vacuum generator 10 through accumulator 20 and system 22, valve 272 can be closed to allow operation of positive displacement pump 270. When this happens, the positive displacement pumps 260, 270 further increase the differential in pressure between vacuum generator 10 and tank 12. This further decreases the pressure above the effluent within tank 12 and increases the withdrawal of ammonia gas from the wastewater in tank 12.

When vacuum generator 10 is operating and maintaining a high vacuum in line 130, positive displacement pumps 260, 270 further increase the vacuum applied through line 142 to tank 12. This assures that a sufficiently low pressure is created in tank 12 to cause the heated wastewater to boil and desorb the ammonia gas. As previously mentioned, to create proper low pressure in tank 12, the liquid of vacuum generator 10 is at a temperature below the temperature of the wastewater in tank 12. This can be accomplished by cooling the liquid in the vacuum generator and/or heating the wastewater. It is possible by using the positive displacement pumps to obtain the vapor pressure for the wastewater without the liquid temperature differential concept of the preferred embodiment.

The ammonia gas together with air, nitrogen, and water vapor of tank 12 are pumped by positive displacement pump 270 to outlet 276 which is directed into accumulator 20 directly above the spray head 230. The highly soluble ammonia gas passing into accumulator 20 from outlet 276 is rapidly absorbed by the low pH liquid 202 spraying from spray head 230. In addition, the surface contact of the soluble ammonia gas with the low pH liquid causes rapid absorption of the ammonia gas into the body of liquid in accumulator 20. This absorption is enhanced by cooling liquid 202 with heat exchanger 240. Since the pH of liquid 202 is low, a large percentage of the absorbed ammonia gas is converted to ammonium ions which remain within the liquid. This is shown by the relationship illustrated in the graph of FIG. 2 wherein approximately all of the ammonia gas is converted to ammonium ions at the neutral 7.0 pH value and at any ph less than neutral. The curve of FIG. 2 is shifted to the right for decreases in temperature. Thus, the tendency to convert the ammonia gas into ammonium ions is enhanced in the cooled body of liquid 202 of accumulator 20.

A condenser 280 having an inlet 282 communicated with the upper portion of accumulator 20 and an outlet 284 communicated with vacuum connecting system 22 further precludes undesirable gases from being directed to the vacuum generator 10 and reducing the effectiveness of the generator. The cooling coils 286 receive cooled liquid from inlet 290 and expel the liquid through outlet 292. By using the condenser, any condensable gases, such as water vapor, can be condensed and drained back into accumulator 20. Since a vast majority of the high soluble ammonia gas is removed by the low pH liquid 202 in accumulator 20, the majority of gases passing into condenser inlet 282 are the slightly soluble gases, such as air and nitrogen, and condensable vapors, such as water vapor. The condensable vapors will be removed by condenser 280. Thus, line 130 essentially receives only the slightly soluble gases, such as oxygen and nitrogen from tank 12. Only a slight amount of ammonia gas and water vapor is passed through line 130 to the vacuum generator. Since the vacuum generator received primarily slightly soluble gases, there is very little tendency to absorb these gases in the pumping liquid of tanks A and B. For that reason, the gases of tanks A, B are generally expelled through outlets 97, 98, instead of being absorbed by the liquid of vacuum generator 10. In this embodiment, there is very little ammonia concentration in the liquid of tanks A and B. It is necessary to drain the liquid from vacuum generator 10 only after prolonged operation, if at all. If accumulator 20 were not used to absorb the desorbed ammonia gas, as shown in the simplified structures of FIGS. 7 and 8, then periodic discharge of the pumping liquid from generator 10 may be necessary. The pumping liquid discharged from the generator has a high amount of ammonia gas dissolved therein when using the schematic embodiments shown in FIGS. 7 and 8. In a like manner, the liquid discharged from accumulator 20 has a high concentration of ammonium ions. These discharged liquids are useful by-products of apparatus A. This by-product may be used by itself or combined with an acid to produce a desirable salt for subsequent commercial use.

MOLECULAR AGITATION MECHANISM

As previously mentioned, the surface tension of the wastewater in tank 12 affects the rate at which the dissolved ammonia gas is desorbed from the wastewater. By increasing the temperature of the wastewater, the surface tension of the wastewater is decreased and the rate of desorption is increased. In accordance with another aspect of the present invention, a further mechanism is used for increasing the rate of desorption in tank 12. This aspect includes a molecular agitator mechanism 310 shown in FIGS. 1 and 5. This mechanism introduces gas bubbles into the wastewater at a pressure greater than the pressure over the wastewater. The gas is one which is not highly soluble in the wastewater, such as nitrogen. A variety of mechanisms could be used for this purpose; however, in accordance with the illustrated embodiment, the molecular agitator mechanism includes an inlet 312, a control valve 314 and a tube 316 extending into tank 12 adjacent the lower portion thereof. A plurality of apertures or openings 318 are provided in tube 316. The low or slightly soluble gas is introduced into tube 316 and small gas bubbles are created within the liquid wastewater of tank 12 by openings 318. These gas bubbles expand rapidly because of the low pressure above the wastewater in tank 12. Thus, there is a rapid increase in volume of the gas entering into tank 12. This increase is proportional to the ratio of the incoming gas pressure and the pressure over the wastewater. The gas bubbles create a certain amount of agitation which reduces the surface tension of the wastewater and increases the rate at which absorbed ammonia gas is desorbed from the wastewater. Other arrangements could be used to provide this molecular agitation by incoming slightly soluble gas. Because of its low solubility the gas does not tend to be absorbed by the wastewater in tank 12. The bubbles expand or explode and continue to flow upwardly through the liquid toward the vacuum above the wastewater in tank 12. This system mechanically forces gas molecules into the vacuum space in tank 12.

QUIESCENT FILLING

Referring again to the vacuum generator 10, the upper sensors 84, 86 are used to provide a quiescent condition as liquid approaches the filled position in both tanks A and B. As is well known, agitation of liquid causes entrapment of gases. Thus, to force a maximum amount of gas from tanks A and B it is advantageous to provide a quiescent condition, especially at the latter part of the filling cycle. This can be done by a variety of mechanisms. One of these is to provide valves 44, 46 with three separate positions. One position is closed, the next position is partially opened and the third position is fully opened. Thus, when fully opened, liquid from vertical pipe 34 flows rapidly into one of the tanks A, B. By shifting the open valve 44 or 46 to a partially closed position, a relatively low flow is then created to complete the filling of the tanks. Referring now to FIG. 6, a schematically represented quiescent valve 44 illustrates this concept. Although only valve 44 is illustrated, this description will apply equally to the other quiescent valve 46 and other valves could be used. Valve 44 includes an inlet chamber 330 and an outlet chamber 332. A three position valve element 334 includes a first valve element 336 and a second valve element 338. In the position shown in FIG. 6, valve 44 is fully opened and liquid is flowing through branch 40 into tank A at a rapid rate. This causes the level of liquid to increase toward level sensor 84. As the level in tank A reaches sensor 84, operator 340 of valve 44 pushes valve element 334 downward by an arm 342 to a first position closing this valve element 336 and leaving element 338 open. This substantially decreases the flow of liquid through branch 40 so that the level of liquid in tank A gradually increases at a slow rate which allows escape of any entrapped gas. After a quiet, gradual increase of the liquid level, the level reaches level sensor 110. At this time operator 340 fully closes valve 44 by closing the second valve element 338. Other arrangements could be provided for creating this quiescent flow at the end of the liquid filling cycle of tanks A, B. This further enhances the efficiency of vacuum generator 10.

OTHER SCHEMATICALLY ILLUSTRATED SYSTEMS

Figure 8:
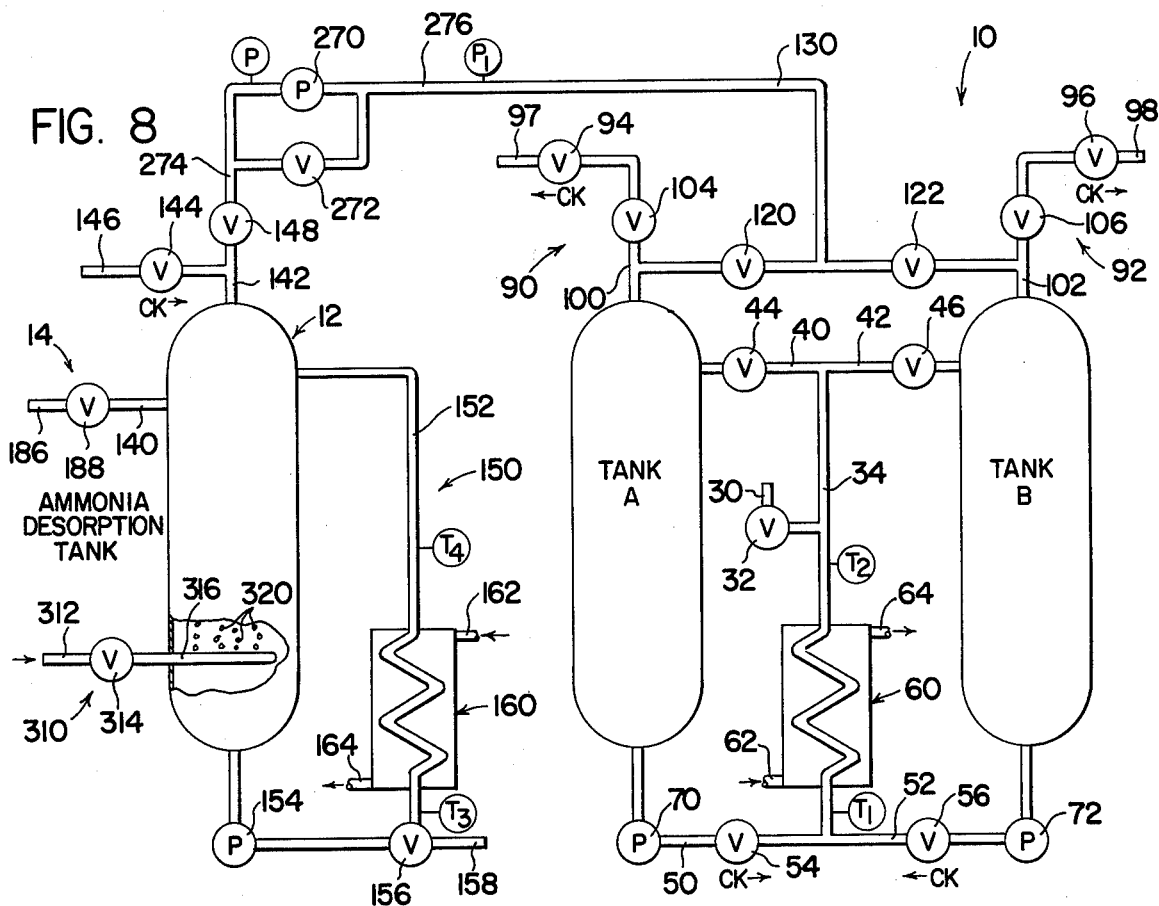
FIG. 8 is a flow diagram illustrating, schematically, a further simplified version of the preferred embodiment of the invention shown in FIG. 1; and, FIG. 9 is a schematic flow diagram illustrating certain concepts of the preferred embodiment of the present invention.
Figure 9:
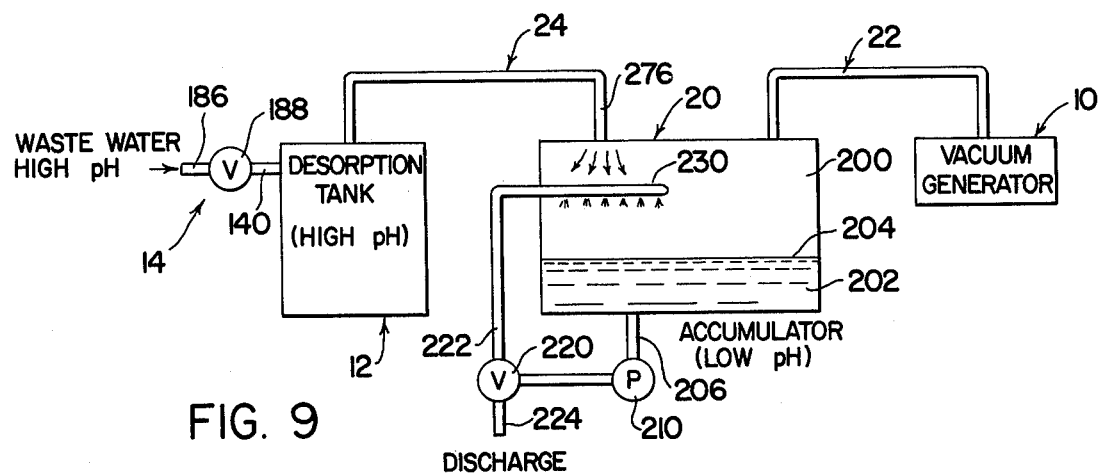

Referring now to FIG. 8, a simplified version of apparatus A is illustrated. In this version, like components of the preferred embodiment have like numbers. It is noted that a single positive displacement pump 270 is connected between vacuum line 130 and gas outlet 142 of tank 12. This increases the vacuum on tank 12, as previously described, without requiring two positive displacement pumps. In this illustrated system, the ammonium gas desorbed in tank 12 will be absorbed by the liquid in tanks A and B. For that reason, these tanks must be periodically recharged with a new body of liquid. The discharged liquid will contain a high amount of nitrogen in the form of dissolved ammonia gas and ammonium ions. The pH of the liquid in tanks A and B is less than the pH of the wastewater coming into tank 12. Referring now to FIG. 9, this figure contains a schematic drawing illustrating certain aspects of the preferred embodiment shown in FIG. 1.

GENERAL DISCLOSURE

The absolute pressure in the cavity above the evacuated tanks A, B approaches the saturation vapor pressure corresponding to the liquid temperature of that particular tank. This absolute pressure will be limited by gases trapped in the vessel, by any leakage of the vessel and by the absorbed gases in the liquid being evacuated. In other words, during evacuation certain gases in the tank itself may appear above the lowering level of liquid in the evacuated vessel. As gases are drawn into the tank A, B being evacuated, some of them will be absorbed by the liquid and the gases not absorbed will be forced out when the tank is subsequently filled. The absorption of ammonia gas in the liquid of the vacuum generator is a function of the temperature and pH of the liquid in this generator. Ammonia gas will change from the ammonia form to an ion as a function of the pH as is illustrated in the graph shown in FIG. 2. This is true also of the liquid in accumulator 20 shown in FIG. 1. In that instance, the absorption of ammonia takes place in the accumulator and very little ammonia actually passes to the vacuum generator.

After a length of time proportional to the differential in pressure between the absolute pressure in the space over the liquid in tank 12 and the vacuum generator pressure, the processed wastewater in tank 12 can be removed either by draining, venting, or pumping. Thereafter, new ammonia contaminated liquid is introduced into tank 12. The pH of the processed, deammoniated liquid may be modified further by adding acid in the neutralization tank 170. The system and method as described herein is somewhat dependent upon the temperature difference between the liquid in generator 10 and the wastewater or ammonia contaminated liquid in tank 12. The flow of gases from the desorbing tank 12 to the accumulator 20 or vacuum generator 10 is due to the difference in absolute pressures corresponding to the vapor pressure for the temperature in each of the respective components. The absolute pressure in the displacement tanks will approach the ideal vapor pressure as a function of the dissolved gases and efficient purging of non-condensable gases and slightly soluble gases, such as air and nitrogen.

When the level of liquid reaches the level sensors 110, 112, the respective valves 104, 196 are first closed. Thereafter, the opened one of valves 44, 46 is closed and the particular pump 70, 72 which is energized is de-energized. By providing cooling for the liquid in vacuum generator 10 in FIGS. 1 and 8, and for both the vacuum generator and accumulator 20 in FIG. 1, a freezing point depressant substance can be used for these cooled liquids to reduce the temperature thereof to a temperature below the normal freezing point for water or other liquid in generator 10 or accumulator 20. This provides a correspondingly low vapor pressure in the vacuum generator and in the accumulator. This is primarily important in the vacuum generator.

The positive displacement pump or blower capacity in CFM is a function of the ratio of the absolute intake pressure to the absolute exhaust pressure for a given blower or pump speed. Thus, the effectiveness of the positive displacement pumps is increased with a decrease in the temperature of the liquid within tanks A, B. By using one or more positive displacement booster pumps, an increase vacuum force is created in the desorption tank 12 which assures a rapid rate of gas removal and permits the desorption of gas at liquid temperatures previously unobtainable in any biological system and/or in any ammonia stripping process now in use. By using the positive displacement pumps, it is possible to desorb ammonia gas from liquid in tank 12 at temperatures equal to or even lower than the temperature of the liquid in the vacuum generator. By providing a low vacuum for the discharge pressures from tank 12, low energy requirements are experienced by apparatus A, as shown in FIG. 1. By providing the by-pass arrangement for the positive displacement pumps or blowers, there is very low energy required to operate these pumps to reduce, still further, the absolute pressure above the liquid in tank 12.

The accumulator 20 is useful in reducing the amount of gas and vapor carried by the vacuum line 130 into the vacuum generator. Addition of acid to the accumulator liquid will counter balance any vapor and/or ammonia gas carried from tank 12 to the accumulator. The heat removed by heat exchangers 60, 240 and condenser 280 can be used for the heat exchanger 160 to conserve energy in the total system.

Having thus defined my invention, I claim:

1. A method for removing ammonia nitrogen from a body of wastewater having an upper surface, a given pH and a given temperature, said method comprising the steps of:
    (a) increasing the pH of said wastewater to a highly basic condition;
    (b) applying to said upper surface of said wastewater a vacuum corresponding approximately to the vapor pressure of said wastewater at said given temperature whereby ammonia is desorbed from said wastewater effluent;
    (c) absorbing said desorbed ammonia in a body of liquid having a pH substantially less than said highly basic condition; and,
    (d) introducing into said wastewater bubbles of a gas which is only slightly soluble in said wastewater.

2. A method for removing ammonia nitrogen from wastewater having a highly basic pH and a given temperature, said method comprising the steps of:

(a) placing said wastewater in a closed container to form a first body of liquid with an upper liquid surface at a pressure greater than the vapor pressure of said wastewater;

(b) providing a second body of liquid in a displacement tank, said second body of liquid having a pH substantially below said highly basic pH;

(c) forceably removing liquid of said second body of liquid from said displacement tank to create a vacuum having a vapor pressure less than the vapor pressure of said wastewater at said given temperature;

(d) communicating said vacuum to said closed container above said upper liquid surface whereby ammonia gas is desorbed from the surface of said first liquid body and is directed to said second body;

(e) forcing liquid of said second body back into said displacement tank to increase the amount of gaseous ammonia absorbed into said second body of liquid; and, (f) introducing into said first body bubbles of a gas which is only slightly soluble in said wastewater and at a pressure greatly exceeding said vapor pressure of said wastewater.

3. A method of removing ammonia nitrogen from a first liquid body of wastewater, said first body having a given pH and a given temperature and in a first container, said method comprising the steps of:

(a) providing a second liquid body of a water based substance having a pH substantially less than said given pH and a temperature substantially less than said given temperature and in a second container;

(b) connecting said first and second containers by a sealed conduit communicated between said first and second liquid bodies; and, (c) applying to said second container a vacuum corresponding approximately to the vapor pressure of said wastewater at said given temperature whereby said ammonia nitrogen is desorbed from said first liquid body and absorbed into said second liquid body.

4. An apparatus for removing ammonia nitrogen from wastewater having a given pH and a given temperature, said apparatus comprising means for increasing the pH of said wastewater; tank means for receiving said highly basic wastewater; means for creating a vacuum corresponding aproximately to the vapor pressure of said wastewater at said given temperature; means for applying said vacuum to said tank means whereby ammonia is desorbed from said wastewater; means for introducing bubbles of a low soluble gas into said wastewater; means for directing said desorbed ammonia and said low soluble gas from said tank means; said vacuum creating means including a displacement tank, means for filling said tank with a liquid with an increasing liquid level, means for sealing said displacement tank, means for creating a vacuum in said sealed displacement tank by forcing said liquid therefrom, and means for communicating said vacuum from said displacement tank to said tank means; and, means for cooling said liquid in said displacement tank.

5. An apparatus for removing ammonia nitrogen from wastewater having a given pH and a given temperature, said apparatus comprising means for increasing the pH of said wastewater; tank means for receiving said highly basic wastewater; means for creating a vacuum corresponding approximately to the vapor pressure of said wastewater at said given temperature; means for applying said vacuum to said tank means whereby ammonia is desorbed from said wastewater; means for introducing bubbles of a low soluble gas into said wastewater; means for directing said desorbed ammonia and said low soluble gas from said tank means; said vacuum creating means including a displacement tank, means for filling said tank with a liquid with an increasing liquid level, means for sealing said displacement tank, means for creating a vacuum in said sealed displacement tank by forcing said liquid therefrom, and means for communicating said vacuum from said displacement tank to said tank means; and, said displacement tank sealing means includes a cavity adjacent the upper portion of said displacement tank for receiving said liquid as said displacement tank is filled; means for venting said cavity to atmosphere; means for holding said liquid in said cavity to block said venting at least while said liquid is being forced from said displacement tank; and means for allowing said liquid to flow from said cavity as said displacement tank is being filled.

6. An apparatus for removing ammonia nitrogen from wastewater having a given pH and a given temperature, said apparatus comprising means for increasing the pH of said wastewater; tank means for receiving said highly basic wastewater; means for creating a vacuum corresponding approximately to the vapor pressure of said wastewater at said given temperature; means for applying said vacuum to said tank means whereby ammonia is desorbed from said wastewater; means for introducing bubbles of a low soluble gas into said wastewater; means for directing said desorbed ammonia and said low soluble gas from said tank means; said vacuum creating means including a displacement tank, means for filling said tank with a liquid with an increasing liquid level, means for sealing said displacement tank, means for creating a vacuum in said sealed displacement tank by forcing said liquid therefrom, and means for communicating said vacuum from said displacement tank to said tank means; and, including means responsive to said increasing liquid level for changing the rate at which said displacement tank is filled.

7. An apparatus as defined in claim 6 wherein said rate changing means includes a valve means having a first condition allowing a first flow rate and a second condition allowing a second flow rate less than said first flow rate and said level responsive means including means for shifting said valve means for said first condition to said second condition.

8. An apparatus for removing ammonia nitrogen from wastewater having a given highly basic pH and a given temperature, said apparatus comprising: a first closed tank means for holding a first body of said highly basic wastewater having a lower portion, said first body having an upper liquid level; a second tank means for holding a second body of liquid separate from said first body and having a pH substantially less than said highly basic pH, said second body having a volume; means for sealing said second tank means; means for removing specific liquid from said sealed second tank means to decrease said volume and whereby a vacuum is created therein; means for communicating said vacuum of said second tank means to said first tank means above said upper liquid level; means for forcing said specific liquid back into said second tank means to increase said volume and whereby ammonia gas from said first tank means is absorbed into said second liquid body of said second tank means and converted therein to ionic form;

and, means for introducing into said first body and adjusting said lower portion bubbles of a gas which is only slightly soluble in said wastewater and has a body entrant pressure greatly exceeding said vapor pressure of said wastewater at said given temperature.

9. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of ammonia gas absorption liquid having a pH substantially less than said high pH, said second body having a second upper liquid surface defining an upper cavity in said second closed container means; sealed conduit means for joining said upper cavities and forming a vacuum chamber including said cavities and said conduit means; vacuum means for creating a vacuum having a pressure at least as low as the vapor pressure of said wastewater at said given temperature; means for communicating said created vacuum with said upper cavity in said second closed container means; said vacuum creating means including means for pumping said second body of liquid from said second container means to thereby increase the volume of said upper cavity in said second closed container means.

10. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of ammonia gas absorption liquid having a pH substantially less than said high pH, said second body having a second upper liquid surface defining an upper cavity in said second closed container means; sealed conduit means for joining said upper cavities and forming a vacuum chamber including said cavities and said conduit means; vacuum means for creating a vacuum having a pressure at least as low as the vapor pressure of said wastewater at said given temperature; means for communicating said created vacuum with said vacuum chamber; said vacuum creating means including means for pumping said second body of liquid from said second container means; and, means for cooling said liquid of said second body by extracting heat energy therefrom.

11. An apparatus as defined in claim 10, including means for adding said extracted heat energy to said first body of liquid.

12. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of ammonia gas absorption liquid having a pH substantially less than said high pH, said second body having a second upper liquid surface defining an upper cavity in said second closed container means; sealed conduit means for joining said upper cavities and forming a vacuum chamber including said cavities and said conduit means, vacuum means for creating a vacuum having a pressure at least as low as the vapor pressure of said wastewater at said given temperature; means for communicating said created vacuum with said vacuum chamber; said vacuum creating means including means for pumping said second body of liquid from said second container means; and, means for introducing said absorption liquid into said second closed container means and combined means for venting said second container means during introduction of said absorption liquid into said second container means for sealing said vacuum chamber during operation of said pumping means, said combined means includes a cavity adjacent the upper portion of said second container means for receiving said absorption liquid as said second container means is filled; means for venting said cavity to atmosphere; means for holding said absorption liquid in said cavity to block said venting at least while said liquid is being pumped from said second container means; and means for allowing said absorption liquid to flow from said cavity and into said second container means as said second container means is being filled.

13. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of ammonia gas absorption liquid having a pH substantially less than said high pH, said second body having a second upper liquid surface defining an upper cavity in said second closed container means; sealed conduit means for joining said upper cavities and forming a vacuum chamber including said cavities and said conduit means; vacuum means for creating a vacuum having a pressure at least as low as the vapor pressure of said wastewater at said given temperature; means for communicating said created vacuum with said vacuum chamber; said vacuum creating means including means for pumping said second body of liquid from said second container means; and, means for introducing said absorption liquid into said second closed container means at a given flow rate and rate changing means responsive to the level of said second body of liquid in said second container means exceeding a selected level for decreasing said given flow rate.

14. An apparatus as defined in claim 13 wherein said rate changing includes a valve means having a first condition allowing a first flow rate and a second condition allowing a second flow rate less than said first flow rate and said level responsive means including means for shifting said valve means from said first condition to said second condition.

15. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of liquid having pH substantially less than said high pH, said second body having a second upper liquid surface defining an upper cavity in said second closed container means; sealed conduit means for joining said upper cavities and forming a vacuum chamber including said cavities and said conduit means; vacuum means for creating a vacuum having a pressure at least as low as the vapor pressure of said wastewater at said given temperature; means for communicating said created vacuum with said vacuum chamber; said vacuum creating means includes first fluid transfer means for introducing said absorption liquid into said second container means to form said second body of liquid, means for venting said second closed container means during operation of said first fluid transfer means, and second fluid transfer means for forcing said absorption liquid from said second container means whereby said vacuum is created above said second body of liquid.

16. An apparatus as defined in claim 15 wherein said first body of liquid has a lower portion and including means for introducing into said first body and adjacent said lower portion bubbles of a gas which is only slightly soluble in said wastewater and has a body entrant pressure greatly exceeding said vapor pressure.

17. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of liquid having a pH substantially less than said high pH, said second body having a second upper liquid surface defining an upper cavity in said second closed container means; sealed conduit means for joining said upper cavities and forming a vacuum chamber including said cavities and said conduit means; means separate from said vacuum chamber for creating a vacuum having a pressure at least as low as the vapor pressure of said wastewater at said given temperature; and, means independent of said conduit means for communicating said created vacuum with said upper cavity in said second closed container.

18. An apparatus as defined in claim 17 wherein said communicating means includes a conduit means for connecting said vacuum creating means with said second container means at a position above said second body of liquid.

19. An apparatus as defined in claim 18 including means in said conduit means for condensing condensable gases flowing from said second closed container means.

20. An apparatus as defined in claim 17 wherein said vacuum creating means includes a displacement tank; means for filling said tank with a liquid having an increasing liquid level; means for sealing said displacement tank from atmosphere; means for creating a vacuum in said sealed displacement tank by forcing said liquid therefrom; and, means for communicating said vacuum in said displacement tank to said vacuum communicating means.

21. An apparatus as defined in claim 20 including means for cooling said liquid in said displacement tank.

22. An apparatus as defined in claim 21 wherein said cooling means absorbs heat energy from said liquid in said displacement tank and including means for adding at least a part of said heat energy to said wastewater in said first container means.

23. An apparatus as defined in claim 20 wherein said displacement tank sealing means includes a cavity adjacent the upper portion of said displacement tank for receiving said liquid as said displacement tank is filled; means for venting said cavity to atmosphere; means for holding said liquid in said cavity to block said venting at least while said liquid is being forced from said displacement tank; and means for allowing said liquid to flow from said cavity as said displacement tank is being filled.

24. An apparatus as defined in claim 20 including means responsive to said increasing liquid level for changing the rate at which said displacement tank is filled.

25. An apparatus as defined in claim 24 wherein said rate changing includes a valve means having a first condition allowing a first flow rate and a second condition allowing a second flow rate less than said first flow rate and said level responsive means including means for shifting said valve means from said first condition to said second condition.

26. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of liquid having a pH substantially less than said high pH, said second body having a second upper liquid surface defining an upper cavity in said second closed container means; sealed conduit means for joining said upper cavities and forming a vacuum chamber including said cavities and said conduit means; vacuum creating means separate from said vacuum chamber for creating a vacuum, said vacuum having a pressure at least as low as the vapor pressure of said wastewater at said given temperature; means independent of said conduit means for communicating said created vacuum with said upper cavity of said second container means; and, means for maintaining said second body liquid at a temperature substantially less than said given temperature.

27. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of liquid having a pH substantially less than said high pH, said second body having a second upper liquid surface defining an upper cavity in said second closed container means; sealed conduit means for joining said upper cavities and forming a vacuum chamber including said cavities and said conduit means; vacuum creating means separate from said vacuum chamber for creating a vacuum, said vacuum having a pressure at least as low as the vapor pressure of said wastewater at said given temperature; and, second conduit means independent of said sealed conduit means for communicating said vacuum with said upper cavity in said second closed container.

28. An apparatus for removing ammonia nitrogen from wastewater having a highly basic condition with a high pH and having a given temperature, said apparatus comprising: a first closed container means for holding a first body of said highly basic wastewater, said first body having a first upper liquid surface defining an upper cavity in said first container means; a second closed container means for holding a second body of liquid having a pH substantially less than said high pH, said second body having a second upper liquid surface defining an upper cavity in said second closed container means; sealed conduit means for joining said upper cavities and forming a vacuum chamber including said cavities and said conduit means; and, removing means for removing said second body of liquid from said closed container means to create a vacuum in said upper cavity in said second closed container means.

29. An apparatus as defined in claim 28 further including means operative after operation of said removing means for forcing liquid into said second closed container to increase the pressure in said upper cavity in said second container means.

* * * * *

UNITED STATES PATENT AND TRADEMARK OFFICE
CERTIFICATE OF CORRECTION

PATENT NO. : 4,093,544
DATED : June 6, 1978
INVENTOR(S) : David S. Ross

It is certified that error appears in the above-identified patent and that said Letters Patent are hereby corrected as shown below:

Cover page, Item [63], "Serial No. 247,262" should read --Ser. No. 547,262--. Item [56] under Other Publications, "R.&G. Clup" should read--R.&G. Culp--. Item [57] in Abstract, line 5, "exposinng" should read--exposing--. Column 1, line 28, delete "an". Column 11, line 29, "know" should read --known--; line 44, "communcation" should read--communication--. Column 13, line 13, "ph" should read --pH--; line 28, "high" should read --highly--. Column 16, line 5, "196" should read --106--; line 25, "increase" should read --increased--. Claim 4, line 6, "aproximately" should read --approximately--. Claim 8, lines 20-21, "adjusting" should read --adjacent--. Claim 12, line 25, after "means" insert --and--. Claim 14, line 2, after "changing" insert --means--. Claim 15, line 9, after "having" insert --a--. Claim 25, line 2, after "changing" insert --means--. Claim 28, line 15, after "said" (second occurrence) insert --second--.

Signed and Sealed this

Twenty-sixth Day of December 1978

[SEAL]

Attest:

RUTH C. MASON
*Attesting Officer*

DONALD W. BANNER
*Commissioner of Patents and Trademarks*